(12) United States Patent
King

(10) Patent No.: US 8,855,475 B2
(45) Date of Patent: Oct. 7, 2014

(54) RADIANT HEATING SYSTEM AND BOILER HOUSING FOR USE THEREIN

(75) Inventor: Ray King, Pickering (CA)

(73) Assignee: Dynacurrent Technologies, Inc. (CA)

( * ) Notice: Subject to any disclaimer, the term of this patent is extended or adjusted under 35 U.S.C. 154(b) by 20 days.

(21) Appl. No.: 13/507,604

(22) Filed: Jul. 13, 2012

(65) Prior Publication Data

US 2013/0016959 A1    Jan. 17, 2013

(30) Foreign Application Priority Data

Jul. 15, 2011   (EP) ..................................... 11174100

(51) Int. Cl.
*F24H 1/20* (2006.01)
*F24H 1/12* (2006.01)

(52) U.S. Cl.
CPC ..................................... *F24H 1/121* (2013.01)
USPC ............ 392/451; 392/441; 392/452; 392/453

(58) Field of Classification Search
None
See application file for complete search history.

(56) References Cited

U.S. PATENT DOCUMENTS

| | | | | |
|---|---|---|---|---|
| 1,376,509 | A | * | 5/1921 | Borst, Jr. ........................ 392/401 |
| 1,458,666 | A | | 3/1924 | Coldwell |
| 1,485,667 | A | | 3/1924 | Coldwell |
| 1,505,179 | A | | 8/1924 | Whiteley |
| 1,509,207 | A | | 9/1924 | Hudson |
| 1,519,395 | A | * | 12/1924 | Clench .......................... 392/493 |
| 1,546,959 | A | | 7/1925 | Wilson |
| 1,759,389 | A | | 5/1930 | Bowen |
| 1,816,850 | A | * | 8/1931 | Hurd .............................. 165/160 |
| 1,850,156 | A | | 3/1932 | Richarson |
| 1,985,830 | A | * | 12/1934 | Hynes ........................... 392/492 |
| 2,205,145 | A | | 6/1940 | Klingner |
| 2,266,216 | A | | 12/1941 | Kimberlin |
| 2,557,369 | A | | 6/1951 | Broderick |
| 2,589,566 | A | * | 3/1952 | Neth et al. .................... 392/479 |
| 2,686,863 | A | * | 8/1954 | Chandler ...................... 392/487 |

(Continued)

FOREIGN PATENT DOCUMENTS

| | | |
|---|---|---|
| CA | 2017503 | 11/1990 |
| CA | 2551341 | 12/2007 |

(Continued)

OTHER PUBLICATIONS

"Glow Plugs as Cooling Water Pre-Heater in Modern Diesel Cars (Type GN)"; Beru AG, Nov. 5, 2002. Archive.org Apr. 22, 2008. <http://web.archive.org/web/20021115200353/http://www.beru.com/english/produkte/gluehkerzen/gn.php>.

(Continued)

*Primary Examiner* — Thor Campbell
(74) *Attorney, Agent, or Firm* — Schmeiser, Olsen & Watts, LLP

(57) ABSTRACT

A radiant heating system comprising a substantially hollow housing having detachable baffle plates internally positioned within the housing. The housing has an inlet and outlet for a flow of coolant to enter into and leave the housing, and a top plate sealing the upper surface of the housing has openings defined therein for insertion of heating elements to project into the housing and be in direct contact with the coolant to heat it. The inlet and the outlet are interconnected with piping to form a closed fluid flow circuit. Two or more baffle plates are used to increase turbulence of the coolant within the housing as it flows through, and temporarily keep coolant in the housing longer to heat it.

15 Claims, 5 Drawing Sheets

(56) References Cited

U.S. PATENT DOCUMENTS

| | | | |
|---|---|---|---|
| 2,745,941 A | | 5/1956 | McElhaney |
| 2,775,682 A | * | 12/1956 | Hynes .......................... 392/492 |
| 2,813,964 A | * | 11/1957 | Cerulli .......................... 392/489 |
| 2,825,791 A | | 3/1958 | Jackson |
| 2,834,865 A | | 5/1958 | Coates |
| 3,171,016 A | | 2/1965 | Sukala |
| 3,209,123 A | | 9/1965 | Windsor |
| 3,353,000 A | | 11/1967 | Tomlinson |
| 3,435,404 A | | 3/1969 | Kato |
| 3,484,580 A | | 12/1969 | Morgan |
| 3,496,991 A | | 2/1970 | Barnd |
| 3,626,148 A | | 12/1971 | Woytowich et al. |
| 3,638,619 A | * | 2/1972 | Hall et al. .................. 122/14.22 |
| 3,646,314 A | | 2/1972 | Windsor |
| 3,673,385 A | * | 6/1972 | Drugmand et al. ........... 392/500 |
| 3,868,494 A | | 2/1975 | Pepin |
| 3,919,520 A | | 11/1975 | Pickard |
| 3,969,605 A | | 7/1976 | Danell |
| 4,208,570 A | | 6/1980 | Rynard |
| 4,245,593 A | | 1/1981 | Stein |
| 4,286,139 A | | 8/1981 | Taylor |
| 4,377,737 A | * | 3/1983 | Berry .......................... 392/401 |
| 4,395,618 A | | 7/1983 | Cunningham ................ 392/492 |
| 4,419,567 A | | 12/1983 | Murphy et al. |
| 4,489,242 A | | 12/1984 | Worst |
| 4,514,617 A | * | 4/1985 | Amit .......................... 392/452 |
| 4,604,515 A | * | 8/1986 | Davidson ..................... 392/492 |
| 4,617,456 A | * | 10/1986 | Richards et al. ............. 219/523 |
| 4,692,592 A | * | 9/1987 | Kale .......................... 392/450 |
| 4,732,229 A | | 3/1988 | Lucht |
| 4,770,134 A | | 9/1988 | Foreman et al. |
| 4,808,793 A | * | 2/1989 | Hurko .......................... 392/489 |
| 4,835,365 A | * | 5/1989 | Etheridge .................... 392/489 |
| 4,891,335 A | * | 1/1990 | McNeilly ..................... 165/80.1 |
| 5,285,963 A | | 2/1994 | Wakefield et al. |
| 5,400,432 A | * | 3/1995 | Kager et al. ................. 392/492 |
| 5,408,960 A | | 4/1995 | Woytowich |
| 5,438,642 A | * | 8/1995 | Posen .......................... 392/485 |
| 6,157,776 A | | 12/2000 | Onken |
| 6,215,310 B1 | | 4/2001 | Petrovich et al. |
| 6,243,535 B1 | * | 6/2001 | Bochud ......................... 392/459 |
| 6,289,177 B1 | * | 9/2001 | Finger et al. ................. 392/485 |
| 6,424,801 B1 | * | 7/2002 | Rabadi ......................... 392/450 |
| 6,647,204 B1 | * | 11/2003 | Hutchinson .................. 392/491 |
| 6,996,336 B1 | * | 2/2006 | Mahoney et al. ............. 392/455 |
| 7,039,305 B1 | * | 5/2006 | Chen .......................... 392/490 |
| 7,082,904 B2 | | 8/2006 | Takano |
| 7,207,379 B2 | | 4/2007 | Takano et al. |
| 7,330,645 B2 | | 2/2008 | Kwon |
| 8,515,268 B2 | * | 8/2013 | Anliker ........................ 392/497 |
| 2002/0146244 A1 | | 10/2002 | Thweatt, Jr. |
| 2003/0039474 A1 | | 2/2003 | Eller et al. |
| 2004/0022529 A1 | | 2/2004 | Lamb |
| 2004/0170411 A1 | | 9/2004 | Kuebler et al. |
| 2006/0163235 A1 | | 7/2006 | Warren et al. |
| 2008/0083737 A1 | | 4/2008 | Vu |
| 2008/0156285 A1 | | 7/2008 | King |
| 2009/0139472 A1 | | 6/2009 | Gehres et al. |
| 2010/0059599 A1 | | 3/2010 | King |
| 2012/0223065 A1 | | 9/2012 | King |
| 2012/0224836 A1 | | 9/2012 | King |
| 2013/0016959 A1 | | 1/2013 | King |

FOREIGN PATENT DOCUMENTS

| | | |
|---|---|---|
| CA | 2668817 | 12/2010 |
| JP | 57-173558 | 10/1982 |
| KP | 10-2004-0001394 A | 1/2004 |
| KR | 10-2004-0001395 A | 1/2004 |
| KR | 10-2004-0061534 A | 7/2004 |
| WO | WO-2008/000076 A1 | 1/2008 |

OTHER PUBLICATIONS

"Internet Archive Wayback Machine." Archive org Apr. 11, 2008. <http://web.archive.org/web/*/http://www.beru.com/english/produkte/gluehkerzen/gn.php>.

US Office Action for U.S. Appl. No. 12/557,682, issued Jun. 19, 2013; 14 pages.

US Office Action for U.S. Appl. No. 13/064,075, issued Jul. 23, 2013; 8 pages.

US Office Action for U.S. Appl No. 12/457,397, issued Jul. 30, 2013, 22 pages.

U.S. Appl. No. 13/666,537, filed Nov. 1, 2012, King, Ray.

U.S. Appl. No. 12/457,397, filed Jun. 10, 2009, King, Ray.

International Preliminary Report on Patentability; PCT/CA2007/001145; 3 pages; Oct. 30, 2008.

Written Opinion of the International Searching Authority; PCT/CA2007/001145; 5 pages; Oct. 5, 2007.

* cited by examiner

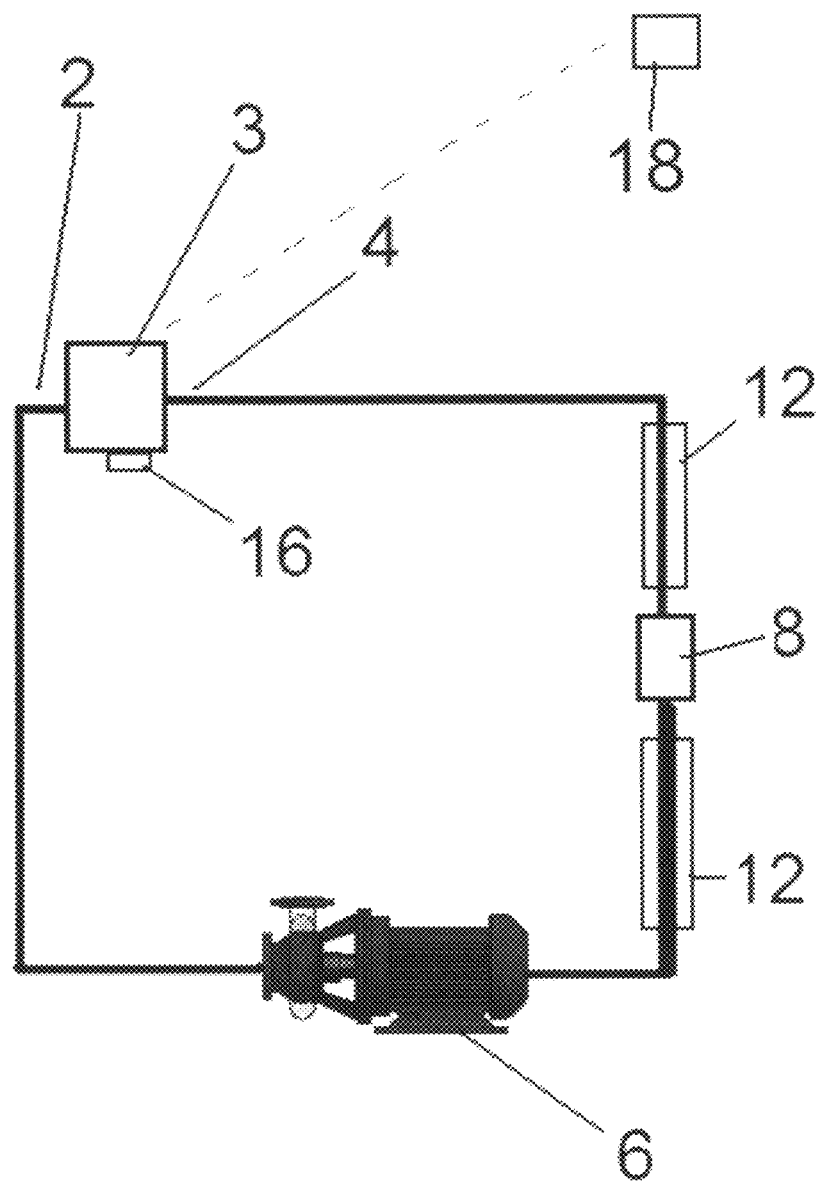

RADIANT HEATING SYSTEM AND BOILER HOUSING FOR USE THEREIN

This invention relates generally to a radiant heating system and to an improved boiler housing for use in a radiant heating system, which is durable and reliable, that is constructed and arranged to receive easily removable or replaceable heating elements, and which can be easily installed.

DESCRIPTION OF THE PRIOR ART

It is well known that, for example, furnaces can be used to heat spaces such as homes. Traditionally, such furnaces were oil furnaces. However, as the demand for oil has risen sharply in the last decade, the price has correspondingly risen sharply, reducing the ability of such furnaces to be economical to the home or business owner. Recently, gas-fired applications, using natural gas, have been much in demand for homeowners in economically heating their home. However, much as has occurred with oil, natural gas has also seen large price increases in the last couple of years, which has also reduced the economical viability of gas-fired applications.

It is also well known to heat homes or spaces using, for example, electrical baseboards, but, as hydro rates have risen quite sharply recently, and can be expected to continue upwardly in the future, these types of devices are not necessarily economical also. In addition, heating systems such as furnaces can require a large footprint, and take up an inordinate amount of space.

In addition, certain types of heating arrangements have utilized electrical elements internally positioned within, whereby coolant can be heated by an electrical element so as to heat an area. U.S. Pat. No. 5,408,960 (Woytowich) and U.S. Pat. No. 4,770,134 (Foreman et al) are examples of such devices. However, these arrangements feature electrical elements that are internally positioned and firmly set within a tank or chamber, and do not allow for easy removal of the electrical element from the pre-heater without complete disassembly, or destruction, of the pre-heater, should maintenance or replacement of the electrical element be required. In such maintenance or replacement situations, the entire unit would be required to be removed to access the internal electrical element, thereby making maintenance and replacement of such pre-heater components difficult and complicated.

What is required is a radiant heating system and an improved boiler housing for use in a radiant heating system, which is very economical, and which can generate substantial amounts of heat to heat larger spaces, such as in a home or business. Thus, there is a need for an improved environmentally friendly radiant heating system and an improved boiler housing for use therein for heating a space which has a generally uncomplicated and simple design, which may be installed easily, and is durable and reliable, and which possesses easily removable or replaceable heating elements. In addition, there is a need for a radiant heating system which possesses a minimal footprint, and which utilizes internally positioned baffle plates of differing lengths within the housing, with a view to increasing the turbulence of the coolant within the housing, so as to temporarily inhibit and keep coolant in the housing longer to heat it in a faster and more efficient manner, and increase water pressure in the system. Further there is a need for a radiant heating system which can be utilized in a variety of applications, from heating a home to radiant floor heating. In this regard, the present invention substantially fulfills this need.

SUMMARY OF THE INVENTION

It is an object of the present invention to provide an improved, environmentally friendly radiant heating system and an improved boiler housing for use therein, which has a generally uncomplicated and simple design, which possesses a minimal footprint, and which has a housing with an inlet and outlet for permitting a flow of coolant therein, which can then be interconnected with piping to form a closed fluid flow circuit.

It is another object of the present invention to provide an improved radiant heating system and boiler housing for use therein, wherein the housing has openings defined therein whereby easily removable electric heating elements can be inserted to project into the housing and be in direct contact with the coolant to heat it.

It is another object of the present invention to provide an improved radiant heating system and boiler housing for use therein, wherein a diameter of the inlet of the housing is greater than a diameter of the outlet, so as to temporarily inhibit and keep coolant in the housing longer to heat it in a faster and more efficient manner.

It is another object of the present invention to provide an improved radiant heating system and boiler housing for use therein, which utilizes internally positioned baffle plates of differing lengths within the housing, with a view to increasing the turbulence of the coolant within the housing, so as to temporarily inhibit and keep coolant in the housing longer to heat it in a faster and more efficient manner, and increase water pressure in the system.

According to one aspect of the present invention, there is provided a radiant heating system constructed and arranged for interconnection to a power source for heating a desired area and having a closed fluid flow circuit comprising: a housing comprising: (a) a top plate for covering and sealing an upper surface of the housing, the top plate having a plurality of openings defined therein and having an inlet for permitting a flow of coolant to enter into the housing and an outlet for permitting a transfer of heated coolant out of the housing, wherein a diameter of the inlet is greater than a diameter of the outlet, the inlet and the outlet being constructed and arranged for connection with an inlet pipe and an outlet pipe, respectively; and (b) at least two baffle plates internally positioned within the housing, the at least two baffle plates having different lengths from one another within the housing; a plurality of heating elements constructed and arranged for insertion into the plurality of openings and projecting into the housing whereby the plurality of heating elements are in direct contact with the coolant; a pump in communication with the heating system for continuously circulating the coolant throughout the closed fluid flow circuit, wherein the inlet pipe and the outlet pipe are interconnected to form the closed fluid flow circuit, the interconnected inlet pipe and outlet pipe being constructed and arranged to radiate heat to the desired area by means of the heated coolant flowing therethrough.

According to another aspect of the present invention, there is provided a radiant heating system constructed and arranged for heating a desired area and having a closed fluid flow circuit comprising a housing comprising: (a) a top plate for covering and sealing an upper surface of the housing, the top plate having a plurality of openings defined therein and having an inlet for permitting a flow of coolant to enter into the housing and an outlet for permitting a transfer of heated coolant out of the housing, wherein a diameter of the inlet is greater than a diameter of the outlet, the inlet and the outlet being constructed and arranged for connection with an inlet pipe and an outlet pipe, respectively; and (b) at least two baffle plates internally positioned within the housing, the at least two baffle plates having different lengths from one another within the housing; a plurality of heating elements constructed and arranged for insertion into the plurality of openings and projecting into the housing whereby the plurality of heating elements are in direct contact with the coolant; a pump in communication with the heating system for continuously circulating the coolant throughout the closed fluid flow circuit; and a power source constructed and arranged for connection with the heating system, the power source supplying the plurality of heating elements and the pump with power; wherein the inlet pipe and the outlet pipe are interconnected to form the closed fluid flow circuit, the interconnected inlet pipe and outlet pipe being constructed and arranged to radiate heat to the desired area by means of the heated coolant flowing therethrough.

According to another aspect of the present invention, there is provided a radiant heating system constructed and arranged for heating a desired area and having a closed fluid flow circuit comprising: a housing comprising: (a) a top plate for covering and sealing an upper surface of the housing, the top plate having a plurality of openings defined therein; (b) an inlet for permitting a flow of coolant to enter into the housing; (c) an outlet for permitting a transfer of heated coolant out of the housing, wherein a diameter of the inlet is greater than a diameter of the outlet, the inlet and the outlet being constructed and arranged for connection with an inlet pipe and an outlet pipe, respectively; (d) at least two baffle plates internally positioned within the housing, the at least two baffle plates having different lengths from one another within the housing; (e) a substantially flat bottom portion; (f) right and left angled portions connected to the bottom portion; and (g) upstanding opposed side wall portions, connected to respective ones of the right and left angled portions; a plurality of heating elements constructed and arranged for insertion into the plurality of openings and projecting into the housing whereby the plurality of heating elements are in direct contact with the coolant; a pump in communication with the heating system for continuously circulating the coolant throughout the closed fluid flow circuit; and a power source constructed and arranged for connection with the heating system, the power source supplying the plurality of heating elements and the pump with power; wherein the inlet pipe and the outlet pipe are interconnected to form the closed fluid flow circuit, the interconnected inlet pipe and outlet pipe being constructed and arranged to radiate heat to the desired area by means of the heated coolant flowing therethrough.

According to another aspect of the present invention there is provided a housing for use in a radiant heating system constructed and arranged for heating a desired area and having a closed fluid flow circuit, the housing comprising an inlet for permitting a flow of coolant to enter into the housing, the housing being constructed and arranged to circulate the flow of the coolant within the housing; a plurality of openings defined therein which are constructed and arranged for insertion of a plurality of heating elements into the plurality of openings and projecting into the housing, whereby the plurality of heating elements are in direct contact with the coolant to heat the coolant; an outlet for permitting a transfer of heated coolant out of the housing, wherein a diameter of the inlet is greater than a diameter of the outlet; a top plate for covering and sealing an upper surface of the housing, the top plate having a plurality of openings defined therein; and at least two baffle plates internally positioned within the housing, the at least two baffle plates having different lengths from one another within the housing; wherein the inlet and the outlet are constructed and arranged for communication and interconnection with an inlet pipe and an outlet pipe, respectively, for forming the closed fluid flow circuit, the interconnected inlet pipe and outlet pipe being constructed and arranged to radiate heat to the desired area by means of the heated coolant flowing therethrough.

The advantage of the present invention is that it provides an improved, environmentally friendly radiant heating system and boiler housing for use therein, which has a generally uncomplicated and simple design, which possesses a minimal footprint, and which has a housing which can circulate and heat a flow of coolant therein. The housing can then be interconnected with piping to form a closed fluid flow circuit, whereby heat from the heated coolant can be used to heat a space remote from the housing. Further, the system can be integrated with pumps, and connected to a power source, whereby the closed fluid flow circuit can be used to circulate and radiate heat in a variety of applications, such as radiant floor heating, home heating, and so forth.

Yet another advantage of the present invention is to provide an improved radiant heating system and boiler housing for use therein, wherein the housing has an inlet for permitting a flow of coolant into and throughout the housing and an outlet for permitting a transfer of heated coolant out of the housing, wherein a diameter of the inlet is greater than a diameter of the outlet so as to keep coolant in the housing longer to heat it, therefore heating the coolant in a faster and more efficient manner.

Yet another advantage of the present invention is to provide an improved radiant heating system and boiler housing for use therein, which utilizes internally positioned baffle plates of differing lengths within the housing, with a view to increasing the turbulence of the coolant within the housing, so as to temporarily inhibit and keep coolant in the housing longer to heat it in a faster and more efficient manner, and increase water pressure in the system.

BRIEF DESCRIPTION OF THE DRAWINGS

A preferred embodiment of the present invention is described below with reference to the accompanying drawings, in which:

FIG. 4 is a flow diagram view of an embodiment of the radiant heating system of the present invention, illustrating the system components.

DESCRIPTION OF THE PREFERRED EMBODIMENT

Figure 1:
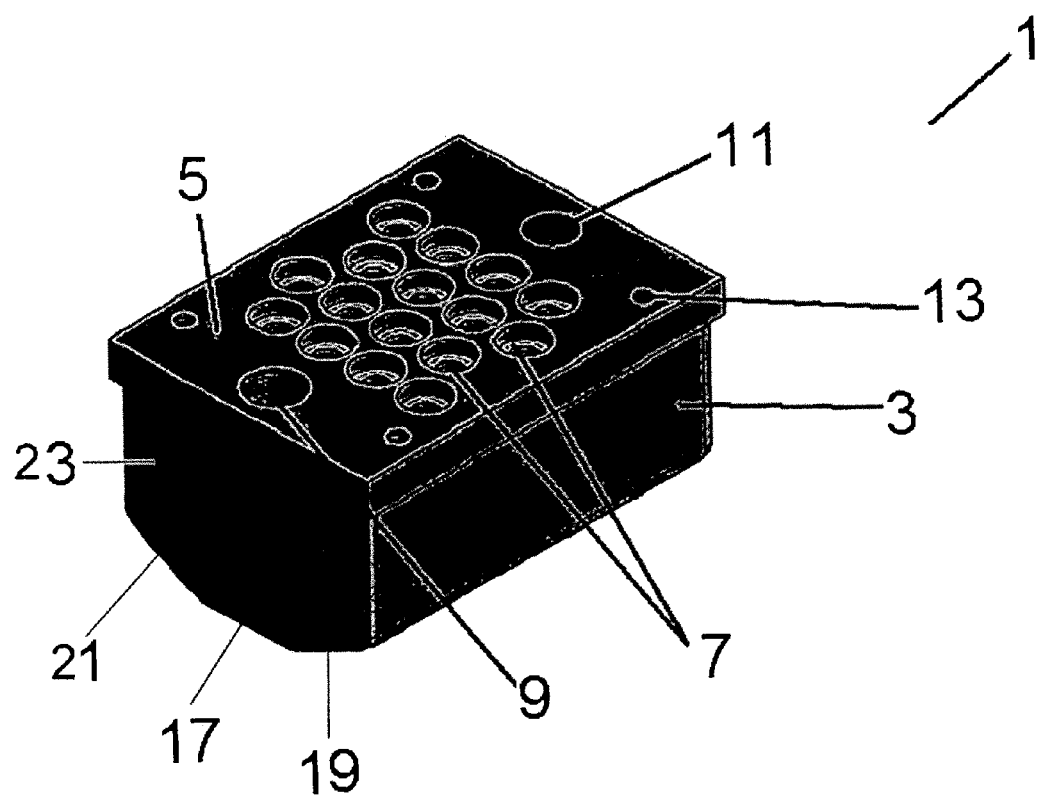
FIG. 1 is a side perspective view of an embodiment of the housing of the radiant heating system of the present invention.
Figure 2:
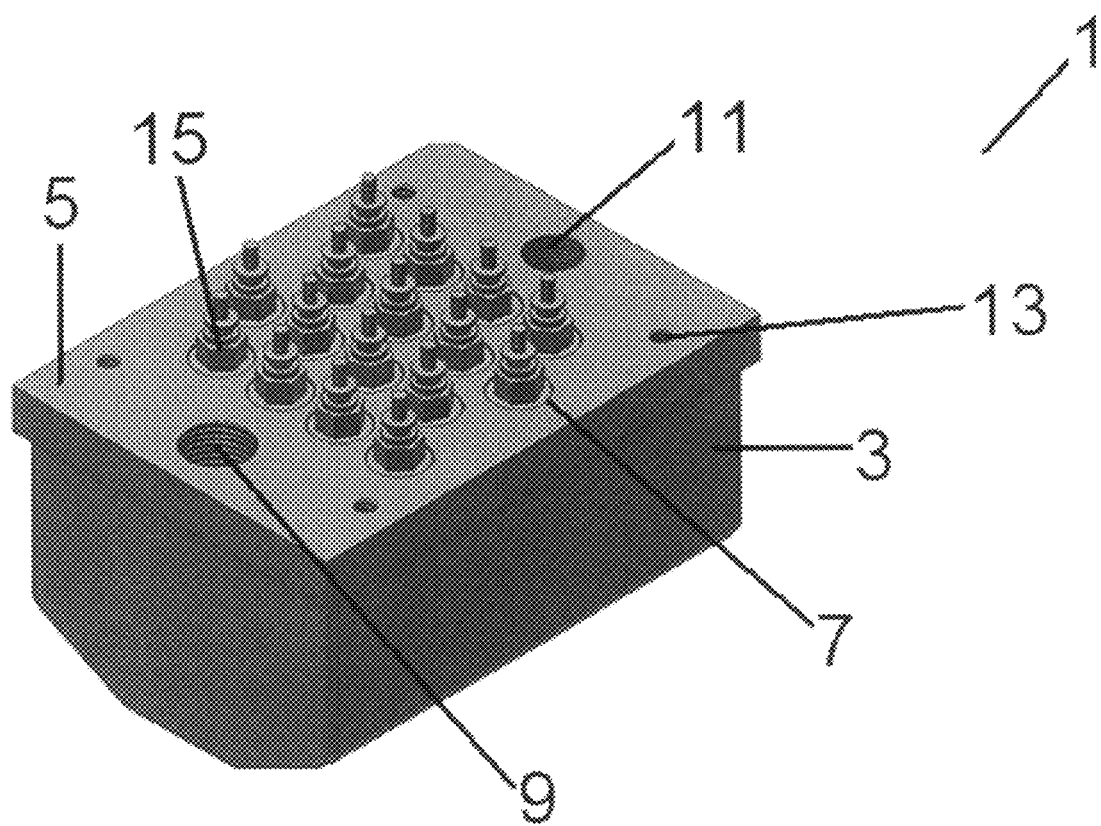
FIG. 2 is a side perspective view of the embodiment of the housing of the radiant heating system of the present invention shown in FIG. 1, shown with the heating elements in position within the housing.

In terms of describing the individual components of the system in greater detail, and with reference to FIGS. 1 to 4, the radiant heating system of the present invention is designated in its entirety by the reference numeral 1. With further reference to FIGS. 1 and 2, there is shown an exemplary embodiment of the housing 3 of the radiant heating system 1 of the present invention, through which coolant (not shown) may pass through the housing. Preferably, the housing 3 is made of metal, such as stainless steel, though it is conceivable that other materials could also be utilized, as would be apparent to one skilled in the art. The size and shape of the housing can be varied, as would be understood.

In an exemplary embodiment, the housing 3 will also have, with reference to FIGS. 1 and 2, a top sealing plate 5 for covering and sealing the top surface of the housing 3, the top sealing plate 5 being connected to the housing 3 by receiving screws or other securing means placed through securing holes 13. The top sealing plate 5 will have an inlet 9 and an outlet 11 for a flow of coolant (not shown) to enter into and leave the housing 3. In addition, the top sealing plate 5 has openings 7 defined therein, for insertion of heating elements 15 therein to project into the housing 3 and be in direct contact with the coolant to heat it. The inlet 9 and the outlet 11 can be interconnected with piping (2,4), as shown in FIG. 4, to form a closed fluid flow circuit. In an exemplary embodiment, a diameter of the inlet 9 is greater than a diameter of the outlet 11, so as to temporarily inhibit and keep coolant in the housing 3 longer to heat it in a faster and more efficient manner. The number of heating elements 15 which could be utilized could be varied, depending upon the application of the system, and the size required of the system.

As noted above, the housing 3 possesses an outlet 11 for a flow of heated coolant to leave the housing 3, as hereinafter described. The inlet 9 and the outlet 11 are constructed and arranged for interconnection with piping (2,4), as shown in FIG. 4, to form a closed fluid flow circuit. Of course, inlet 9 will be interconnected with inlet pipe 2 and outlet 11 will be interconnected with outlet pipe 4. Once the inlet pipe and outlet pipe are interconnected to the system 1, a pump 6 and a power source 8, as shown in FIG. 4, can be interconnected to the system to circulate the coolant in the closed fluid flow circuit, and through the system 1, it being understood that conventional power sources or pumps could be utilized. For example, in one embodiment, the power source can be an electrical type power source, or a power pack that can be plugged in by means of a power cord, though it is conceivable that, alternatively, other types of power sources could be utilized, such as solar power cells, A/C power, DC power pack, battery, wind generated power sources or the like, as would be apparent to one skilled in the art. It will be understood that the power source can be activated conventionally, or, for example, by a remote device (not shown), as would be understood by one skilled in the art.

The housing 3, as noted previously, has openings 7 defined therein, for insertion of heating elements 15 therein (shown in FIG. 2) to project inwardly into the housing 3 and be positioned so as to be in direct contact with the coolant to heat it. The number of heating elements 15 which could be utilized could be varied, depending upon the application of the system, and the size required of the system. For example, as few as two heating elements could be used, or up to sixteen, or more.

Preferably, the coolant will be water, though it is conceivable that other fluids could be utilized, as would be apparent to one skilled in the art. Of course, heating elements 15 are connected to, and supplied with, power from the power source 8 for enabling the heating elements 15 to heat the coolant, the coolant of course being circulated throughout the system by the pump 6. The electrical connection portion of heating elements 15 can, as an example, be made of Inconel™, it being understood that this refers to a family of austenitic nickel chromium-based super-alloys, which are typically used in high temperature applications. Common trade names for Inconel™ include: Inconel 625™, Chronin 625™, Altemp 625™, Haynes 625™, Nickelvac 625™ and Nicrofer 6020™, for example. Preferably, any of the heating elements 15 are easily removable and replaceable if required from the housing 3.

Figure 3A:
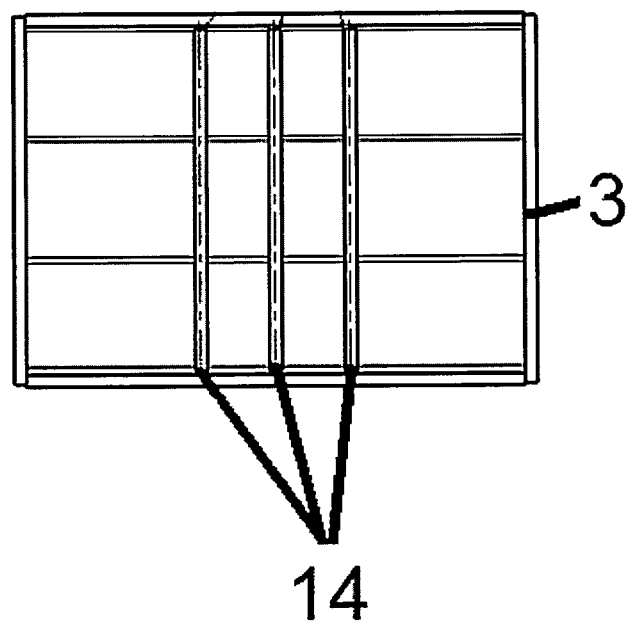
FIG. 3A is a top view of an embodiment of the housing of the radiant heating system of the present invention shown in FIG. 1, with the top cover removed and illustrating the internal baffle plates.
Figure 3B:
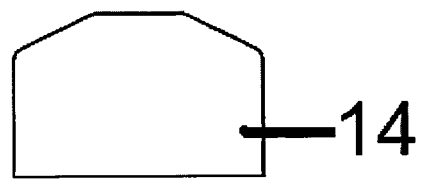
FIG. 3B is a side view of an embodiment of the baffle plates for insertion within the housing of the of the radiant heating system of the present invention.
Figure 3B:
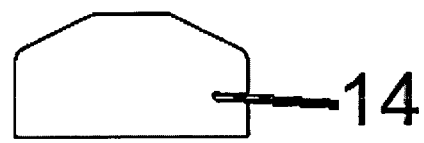
Figure 3B:
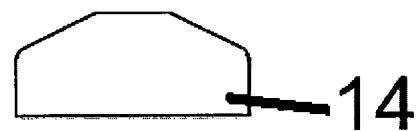

In an exemplary embodiment, and with reference to FIGS. 3A and 3B, the housing 3 possesses two or more baffle plates 14 of differing lengths (clearly shown in FIG. 3B) from one another within the housing 3, which can be positioned within the interior of the housing 3. The baffle plates 14 serve to increase the turbulence of the coolant within the housing as it flows through, and so as to temporarily inhibit and keep coolant in the housing longer to heat it in a faster and more efficient manner, and increase water pressure in the system. Preferably, the baffle plates 14 do not extend to a same height as that of the sides of the housing 3. The baffle plates 14 can be substantially solid, and are preferably made of metal. Further, the baffle plates 14 can be arranged to run horizontally, across the housing 3 as shown In FIG. 3A, or, alternatively, may run along a substantial interior length of the housing 3, or a partial length thereof.

Further, with reference to FIG. 1, the housing 3 comprises a substantially flat bottom 17, and right 19 and left angled 21 bottom portions, which are then integrally connected to side walls 23 of the housing. In an exemplary embodiment, a shape of the baffle plates 14 will correspond to the shape of the housing 3 in this respect.

Radiator panels 12, as shown in FIG. 4, can be connected to the closed fluid flow circuit to radiate the heat from the coolant flowing in the circuit to a space to be heated by the radiant heating system 1. Such a space could be, for example, a home, a room, an office, radiant flooring or a building. If desired, such generated heat can be circulated by means of a conventional fan or blower.

The radiant heating system 1 can be activated by a remote device 18, as shown in FIG. 4, by a user, whereby the power source can be activated to heat the heating elements, and the interconnected system, remotely from a distance, and this heat can then be transferred by way of the heat emitting radiator panels 12 or the like into the space to be heated.

In another alternative embodiment of the present invention (not shown), coolant can be omitted, and dry heat, provided from the heating elements, can be utilized. In this embodiment (not shown) the housing 3 would preferably have an air passageway extending therethrough for passage of air through the housing 3. Heating elements would be inserted and mounted into the openings, the heating so as to project into the housing whereby the heating elements are in direct contact with air in the air passageway. A power source in communication with the radiant heating system would supply the electric heating elements with power, for enabling the heating elements to heat the air. An air blower, for example, or other such device, could then direct the heated air to an area external to the radiant heating system, such as a house or other enclosed structure, the air blower being supplied with power from the power source. As an example, the heated air can then be circulated by means of the conventional air handler/blower (not shown) through the ductwork of a home.

In an alternative embodiment, the radiant heating system can further comprise a thermostatic control 16, as shown in FIG. 4, in association with the heating elements 15 and the coolant in the housing 3, wherein the thermostatic control 16 is adapted to deactivate the heating elements 15 when a temperature of the coolant exceeds a pre-determined level. Further, the thermostatic control 16 can also thus turn the heating elements 15 on when a temperature of the coolant falls below a pre-determined level.

The present invention has been described herein with regard to preferred embodiments. However, it will be obvious The embodiments of the invention in which an exclusive property or privilege is claimed are defined as follows:

1. A radiant heating system constructed and arranged for interconnection to a power source for heating a desired area and having a closed fluid flow circuit comprising:
a housing comprising:
(a) a top plate for covering and sealing an upper surface of the housing, the top plate having a plurality of openings defined therein and having an inlet for permitting a flow of coolant to enter into the housing and an outlet for permitting a transfer of heated coolant out of the housing, wherein a diameter of the inlet is greater than a diameter of the outlet, the inlet and the outlet being constructed and arranged for connection with an inlet pipe and an outlet pipe, respectively; and
(b) at least two baffle plates internally positioned within the housing, the at least two baffle plates having different lengths from one another within the housing;
a plurality of heating elements constructed and arranged for insertion into the plurality of openings and projecting into the housing whereby the plurality of heating elements are in direct contact with the coolant, the plurality of heating elements being accessible from an exterior surface of the housing to permit removal of the plurality of heating elements from the housing without disassembly of the housing and without disconnection of the housing from the closed fluid flow circuit;
a pump in communication with the heating system for continuously circulating the coolant throughout the closed fluid flow circuit,
wherein the inlet pipe and the outlet pipe are interconnected to form the closed fluid flow circuit, the interconnected inlet pipe and outlet pipe being constructed and arranged to radiate heat to the desired area by means of the heated coolant flowing therethrough.

2. The radiant heating system of claim 1, wherein the system further comprises a thermostatic control in association with the plurality of heating elements and the coolant in the housing, wherein the thermostatic control is adapted to turn the plurality of heating elements off when a temperature of the coolant exceeds a pre-determined level.

3. The radiant heating system of claim 2, wherein the thermostatic control is adapted to turn the plurality of heating elements on when a temperature of the coolant falls below a pre-determined level.

4. The radiant heating system of claim 1, wherein the power source is a power pack.

5. The radiant heating system of claim 1, wherein the power source is an electrical battery.

6. The radiant heating system of claim 1, wherein the plurality of heating elements are DC heating elements.

7. The radiant heating system of claim 1, wherein the system further comprises a remote device for activating, at a distance from the housing, the power source to provide the power to the plurality of heating elements and the pump.

8. The radiant heating system of claim 1, wherein the housing is substantially hollow.

9. The radiant heating system of claim 1, wherein at least one radiator panels is connected to the closed fluid flow circuit to radiate heat from the heated coolant flowing in the closed fluid flow circuit to heat the desired area.

10. The radiant heating system of claim 1, wherein the housing further comprises a substantially flat bottom portion, right and left angled portions connected to the substantially flat bottom portion and upstanding opposed side wall portions, connected to respective ones of the right and left angled portions.

11. A radiant heating system constructed and arranged for heating a desired area and having a closed fluid flow circuit comprising:
a housing comprising:
(a) a top plate for covering and sealing an upper surface of the housing, the top plate having a plurality of openings defined therein and having an inlet for permitting a flow of coolant to enter into the housing and an outlet for permitting a transfer of heated coolant out of the housing, wherein a diameter of the inlet is greater than a diameter of the outlet, the inlet and the outlet being constructed and arranged for connection with an inlet pipe and an outlet pipe, respectively; and
(b) at least two baffle plates internally positioned within the housing, the at least two baffle plates having different lengths from one another within the housing;
a plurality of heating elements constructed and arranged for insertion into the plurality of openings and projecting into the housing whereby the plurality of heating elements are in direct contact with the coolant, the plurality of heating elements being accessible from an exterior surface of the housing to permit removal of the plurality of heating elements from the housing without disassembly of the housing and without disconnection of the housing from the closed fluid flow circuit;
a pump in communication with the heating system for continuously circulating the coolant throughout the closed fluid flow circuit; and
a power source constructed and arranged for connection with the heating system, the power source supplying the plurality of heating elements and the pump with power;
wherein the inlet pipe and the outlet pipe are interconnected to form the closed fluid flow circuit, the interconnected inlet pipe and outlet pipe being constructed and arranged to radiate heat to the desired area by means of the heated coolant flowing therethrough.

12. The radiant heating system of claim 11, wherein the plurality of heating elements are electric heating elements.

13. A housing for use in a radiant heating system constructed and arranged for heating a desired area and having a closed fluid flow circuit, the housing comprising:
an inlet for permitting a flow of coolant to enter into the housing, the housing being constructed and arranged to circulate the flow of the coolant within the housing;
a plurality of openings defined therein which are constructed and arranged for insertion of a plurality of heating elements into the plurality of openings and projecting into the housing, whereby the plurality of heating elements are in direct contact with the coolant to heat the coolant, the plurality of openings being constructed and arranged to permit access to the plurality of heating elements from an exterior surface of the housing to permit removal of the plurality of heating elements from the housing without disassembly of the housing and without disconnection of the housing from the closed fluid flow circuit;
an outlet for permitting a transfer of heated coolant out of the housing, wherein a diameter of the inlet is greater than a diameter of the outlet;
a top plate for covering and sealing an upper surface of the housing, the top plate having a plurality of openings defined therein; and at least two baffle plates internally positioned within the housing, the at least two baffle plates having different lengths from one another within the housing;

wherein the inlet and the outlet are constructed and arranged for communication and interconnection with an inlet pipe and an outlet pipe, respectively, for forming the closed fluid flow circuit, the interconnected inlet pipe and outlet pipe being constructed and arranged to radiate heat to the desired area by means of the heated coolant flowing therethrough.

14. The housing of claim 13, wherein the housing is substantially hollow.

15. The housing of claim 13, wherein the housing further comprises a substantially flat bottom portion, right and left angled portions connected to the substantially flat bottom portion and upstanding opposed side wall portions, connected to respective ones of the right and left angled portions.

* * * * *

UNITED STATES PATENT AND TRADEMARK OFFICE
CERTIFICATE OF CORRECTION

Page 1 of 1

PATENT NO.       : 8,855,475 B2
APPLICATION NO.  : 13/507604
DATED            : October 7, 2014
INVENTOR(S)      : Ray King It is certified that error appears in the above-identified patent and that said Letters Patent is hereby corrected as shown below:

In the Claims

In Claim 9, Column 7, Line 62 delete the word "panels" and insert the word --panel--.

Signed and Sealed this
Ninth Day of June, 2015

Michelle K. Lee
*Director of the United States Patent and Trademark Office*